United States Patent
Funk et al.

(10) Patent No.: US 10,065,599 B1
(45) Date of Patent: Sep. 4, 2018

(54) SECURITY INSERT FOR VEHICLE CONSOLES

(71) Applicant: Bestop Tuffy, LLC, Louisville, CO (US)

(72) Inventors: John P. Funk, Dove Creek, CO (US); Shawn Gregory, Cortez, CO (US)

(73) Assignee: Bestop Tuffy, LLC, Louisville, CO (US)

( * ) Notice: Subject to any disclaimer, the term of this patent is extended or adjusted under 35 U.S.C. 154(b) by 0 days.

(21) Appl. No.: 15/600,281

(22) Filed: May 19, 2017

Related U.S. Application Data (60) Provisional application No. 62/339,760, filed on May 20, 2016.

(51) Int. Cl.
*B60R 25/01* (2013.01)
*B60R 7/04* (2006.01)

(52) U.S. Cl.
CPC ............... *B60R 25/01* (2013.01); *B60R 7/04* (2013.01)

(58) Field of Classification Search
CPC .................................. B60R 25/01; B60R 7/04
USPC ....................................................... 296/24.34
See application file for complete search history.

(56) References Cited

U.S. PATENT DOCUMENTS

| | | | |
|---|---|---|---|
| 5,085,481 A * | 2/1992 | Fluharty | B60R 7/04 296/37.14 |
| 6,733,096 B2 | 5/2004 | Bae | |
| 7,566,040 B2 * | 7/2009 | Lota | B60R 7/04 224/926 |
| 7,884,283 B1 | 2/2011 | Ousley | |
| 7,975,515 B2 | 7/2011 | Ygnelzi et al. | |
| 9,010,257 B2 | 4/2015 | McAlexander | |
| 9,132,786 B2 | 9/2015 | Roach et al. | |
| 9,238,439 B2 | 1/2016 | Huebner et al. | |
| 2011/0215605 A1 * | 9/2011 | Spitler | B60N 3/00 296/24.34 |
| 2014/0291372 A1 | 10/2014 | Smith | |
| 2016/0024816 A1 | 1/2016 | Simon et al. | |
| 2016/0090047 A1 | 3/2016 | Huebner et al. | |
| 2016/0114732 A1 | 4/2016 | Sawada et al. | |

OTHER PUBLICATIONS

"www.lockerdown.com." Lock'er Down Security Products, www.lockerdown.com/, retrieved from web Aug. 23, 2017.

* cited by examiner

*Primary Examiner* — Joseph Pape
(74) *Attorney, Agent, or Firm* — Warn Partners, P.C.

(57) ABSTRACT

An insert for a vehicle console is provided. The insert includes a frame having first and second opposing retention flanges, each first retention flange being hingedly supported from the frame, such that each retention flange is capable of rotating away from the frame. A support strut is also provided for restraining the retention flanges from pivoting away from a position extending beyond the access opening of said vehicle console. Removal of a lockable lid connected with the frame becomes almost impossible without total destruction of the vehicle console.

20 Claims, 7 Drawing Sheets

SECURITY INSERT FOR VEHICLE CONSOLES

CROSS-REFERENCE TO RELATED APPLICATIONS

This application claims the benefit of U.S. Provisional Application No. 62/339,760 filed May 20, 2016. The disclosures of the above application are incorporated herein by reference.

FIELD OF THE INVENTION

This invention generally relates to a device or system for preventing access to the interior of a vehicle console, such as a storage console found between the front seats of a vehicle.

BACKGROUND OF THE INVENTION

Common approaches at providing theft-proofing of secure vehicle consoles often consists of simply providing a fully welded steel box (vault) that is bolted into place within the console. Another approach is to use a lid unit that is inserted into the console, and is then supported by a number of customer assembled brackets and panels. An example of this type of system is sold under the trademark "Console Vault." Another device is sold under the trademark "Lock'er Down." It is desirable to provide a more secure vehicle console that is inexpensive, easy to install and that provides equal or greater protection than such devices currently available.

SUMMARY OF THE INVENTION

To make manifest the above noted and other gainful desires, a revelation of the present invention is brought forth. The present invention endows a freedom of an insert for a vehicle console, including a frame having first and second opposing retention flanges, each first retention flange being hingedly supported from the frame, such that each retention flange is capable of rotating away from the frame. A support strut is also provided for restraining the retention flanges from pivoting away from a position extending beyond the access opening of said vehicle console. Removal of a lockable lid connected with the frame becomes almost impossible without total destruction of the vehicle console. a damping arrangement is also provided between the lockable lid and frame.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
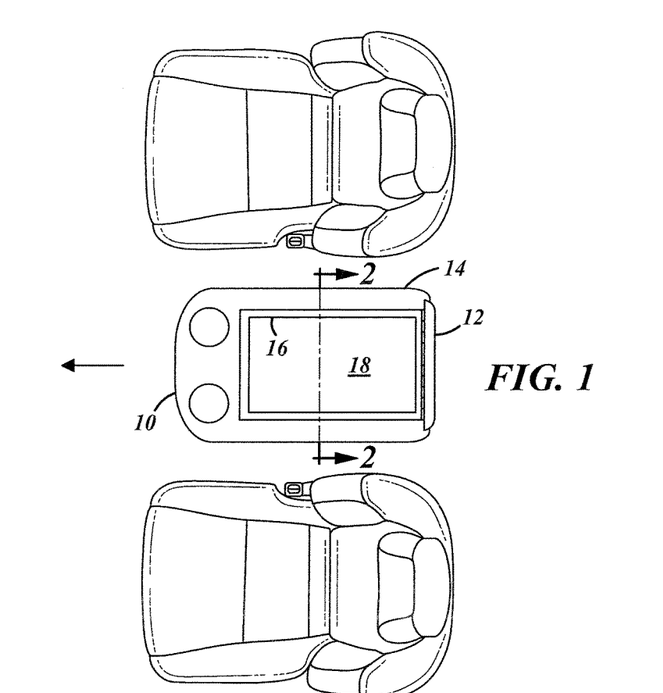
FIG. 1 is a schematic view looking down at a common vehicle seat and center console arrangement in a vehicle, the factory installed console lid being hinged and shown in an opened position.
Figure 2:
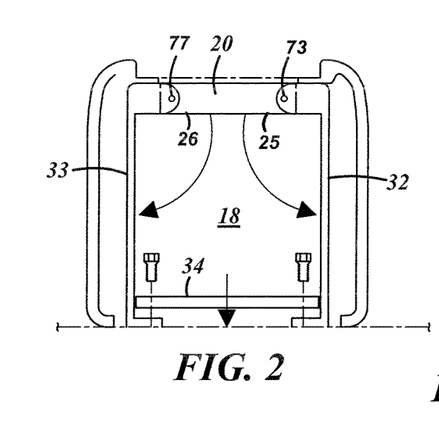
FIG. 2 is a schematic sectional view of the console arrangement of FIG. 1 with an embodiment of the present invention installed therein with a locking lid being removed for clarity of illustration.
Figure 3:
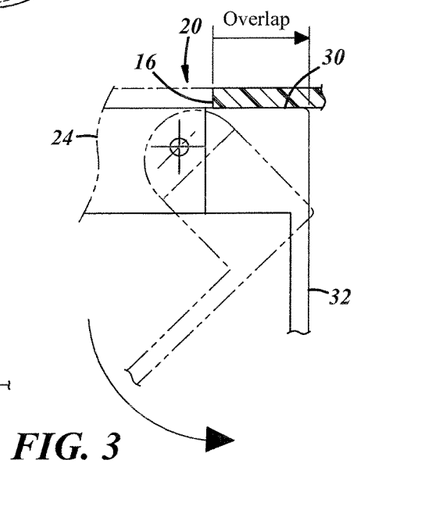
FIG. 3 illustrates the opening of an example of the retention flanges with integral support struts, and also illustrates the opening of the retention flanges away from a frame of an inventive automotive console insert.

Turning now to FIGS. 1-3 where a vehicle console 10 having a factory supplied lid 12 and a top flange 14 with an access opening 16 below the lid 12 has been illustrated. FIG. 1 also shows that the vehicle console 10 creates an interior storage area 18 that is accessed through the access opening 16. Referring to FIG. 2 it will be understood that the disclosed insert 20 is used for supporting and retaining a lockable lid (not shown in this view that is connected with the insert 20) that prevents unauthorized access to the interior storage area 18 through the access opening 16 of the vehicle console 10.

The lockable lid 12 is supported from a frame 24 that has opposing sides 25, 26, the frame 24 being adapted for supporting and retaining the lockable lid. The sides 25, 26 of the frame 24 support first and second retention flanges 32, 33 that are hingedly supported from one of the opposing sides of the frame 24, such that the retention flanges 32, 33 are capable of angularly rotating away from one of the opposing sides of the frame along a pivotal axis 73, 77 generally parallel to one of the opposing sides of the frame. A second retention flange 33 is hingedly supported from one of the opposing sides of the frame that does not support the other retention flange, such that each of the retention flanges are capable of angularly rotating away from one of the opposing sides of the frame. The first and second retention flanges 32, 33 are capable of extending away from each other, so that extending both retention flanges 32, 33 away from the frame after the frame 24 has been inserted the access opening 16 of the vehicle console 10 results in trapping the frame 24 within the console. As illustrated, the retention flanges 32, 33 are hingedly or pivotally connected to the frame such that they remain generally parallel to one of the opposing sides of the frame when the flanges are extending away from the frame. This will allow the retention flanges to extend beyond the access opening of the vehicle console, and thus trap the frame within the console by engaging inwardly extending lip areas of access opening of the console which provide sealing surfaces for the vehicle console lid.

FIGS. 2 and 3 also show that the first retention flange and the second retention flange each is further adapted for accepting a support strut 34, the support strut being adapted for attachment, or integrally attached to, the respective retention flange, so that the support strut retains the frame against the top flange of the console when the respective retention flanges are extended away from the frame.

Referring to FIGS. 4-11, an alternate preferred embodiment 107 insert of the present invention is provided. Insert 107 has a frame 110. Hingedly attached to the frame 110 are first retention flange 112 and second retention flanges 114. Each retention flange has a plurality of legs 116. Each leg adjacent an extreme end has a foot 118. Foot 118 has a pressed-in nut 120 to threadably receive a threaded fastener 122. Threaded fastener 122 passes through an aperture 124 to connect the support strut 126 with the legs 116 of the opposing retention flanges 112, 114 to prevent the retention flanges from pivoting away from a position extending beyond the access opening 130. If desired, fastener 122 can be lengthened to connect with the console floor or even beyond with a floor panel or other body portion of the vehicle. The hole that is utilized with a lengthened fastener 122 is inserted into may be factory predrilled or can be drilled by a self-threading fastener. The feet 118 on their lower surface 132 may have a coated or adhesively applied anti-vibrational or rattle material, common examples being cork, a foamed elastomeric or other polymeric material. A top surface 134 of the retention flanges can have an adhesive layer to aid their retention to the underside of the flange of the console and to dampen any vibration or rattle. Each retention flange has a hinge arm 136 with an aperture 138 to allow the retention flange to be hinged along at least two positions with the frame 110. The retention flanges 112, 114 extend along and have a pivotal axis along a transverse axis of the vehicle. In the embodiment of the invention shown in FIGS. 1-3, the retention flanges extend along and have a pivotal axis along a fore and aft axis of the vehicle.

Connected by a pinned hinge 142 to the frame 110 is a lockable lid 140. The lid 140 has an aperture 144 (on both sides) allowing for insertion of a headed pivot pin 146. Pin 146 connects with the lid 140 a slotted pivot link 148 having a slot 150. Slot 150 captures a shank of a hex nut pin 152. The frame 110 has a pivot mounting bracket 154. A rearward end of the mounting bracket has an aperture 156 and a headed pivot pin 158. Pin 158 is used to pivotally hinge the retention flange 112. The mounting bracket 154 has a forward aperture 160 to receive pin 152 (note: apertures 144, 160 are provided on both sides to allow the slotted pivot link 148 to be installed on either or both sides to satisfy customer desire for vehicles with steering on the right or left, or other customer preferences). Pin 152 is threadably connected with a nylon lock type nut that abuts an outboard end of the frame 110. A combination of nylon and/or steel washers 168 can be provided on both sides of the slotted link 148. The torque on pin 152 into the nut 164 determines the dampening of the pivotal movement of the lid 140 with respect to the frame 110. The dampening force may be adjusted upward to compensate for wear. The utilization of the pivotal slotted link 148 allows the pivotal dampening mechanism to take up less space when the lid 140 is folded downward into the frame 110 for shipping the insert 107 to the customer.

Insert 107 also includes a rear plate 170 to be placed between the frame 110 and an aft surface 172 of the console flange 174. The retention flange 112 top surface has a slot or opening 175 (see FIG. 9) to allow for passage of a vertical portion 176 of the rear plate. The rear plate is provided to conceal any possible gaps between the frame 110 and the access opening 130. In a similar fashion, a front plate 178 is provided. Front plate 178 can be connected with the frame 110 by fasteners 179 and the slot 175 of the retention flange 114 allows for any passage required for a lower portion 180 of the front plate 178.

Figure 4:
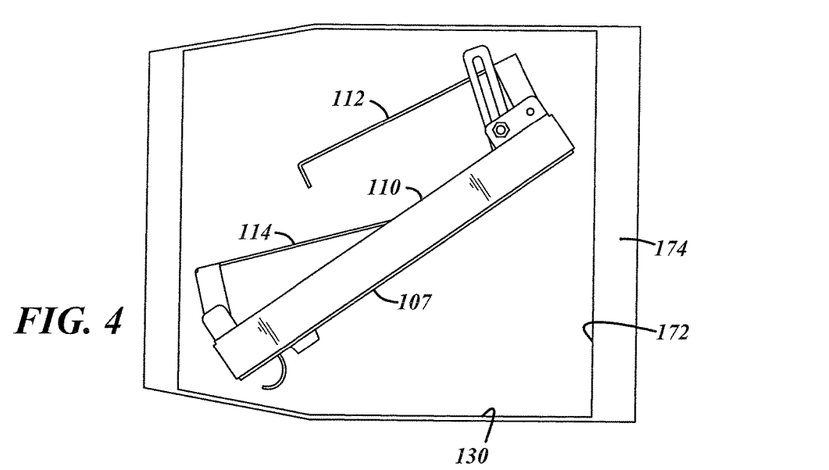
FIG. 4 is a top view of a preferred embodiment insert of the present invention being inserted into a vehicle console.
Figure 5:
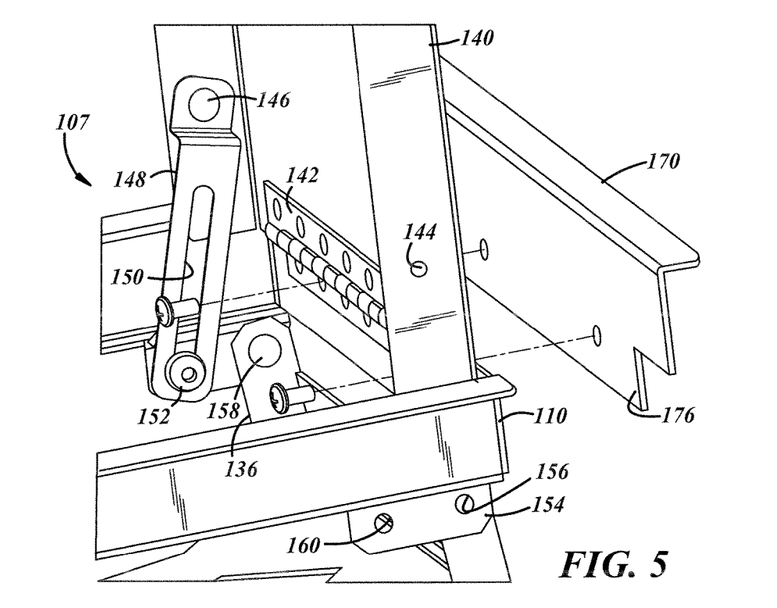
FIG. 5 is an enlarged partial perspective view of a portion of the insert shown in FIG. 4.
Figure 6:
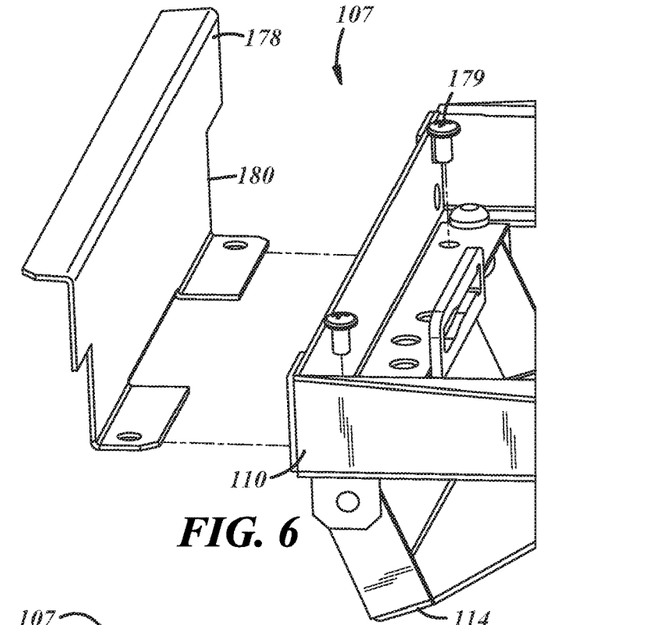
FIG. 6 is an enlarged partial perspective view of another portion of the insert shown in FIG. 4.
Figure 7:
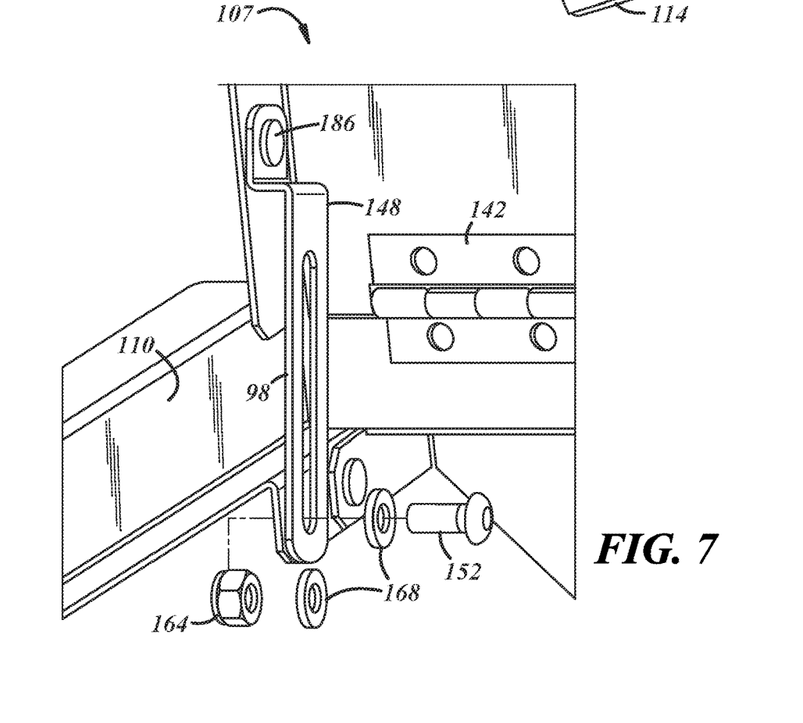
FIG. 7 is yet another enlarged perspective view of another portion of the insert shown in FIG. 4.
Figure 8:
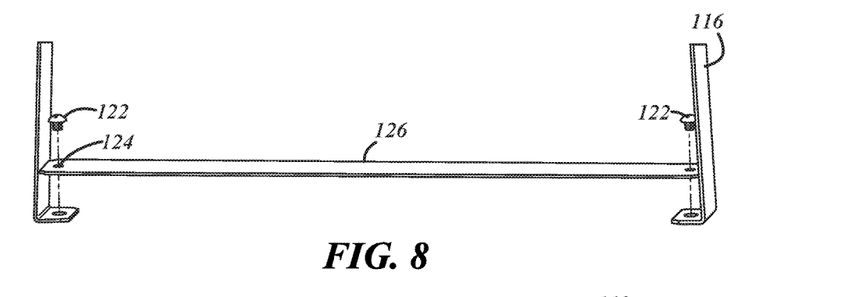
FIG. 8 is still yet another enlarged perspective view of the insert shown in FIG. 4 during assembly.
Figure 9:
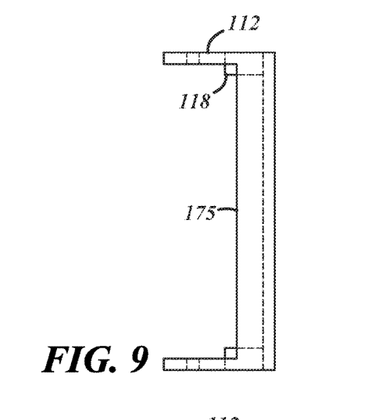
FIG. 9 is a top plane view of a retention flange of the inventive insert shown in FIG. 4.
Figure 10:
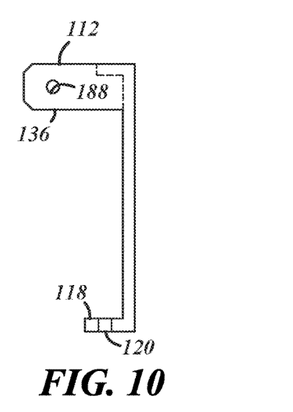
FIG. 10 is a side view of a retention flange of the inventive insert shown in FIG. 4.
Figure 11:
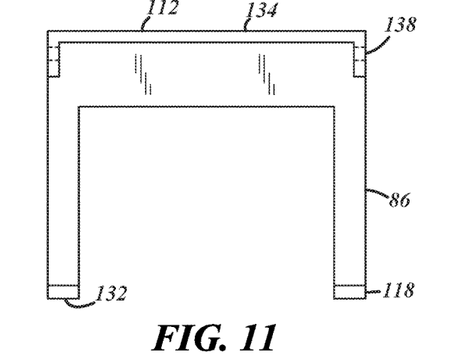
FIG. 11 is a front plane view of a retention flange of the inventive insert shown in FIG. 4.

To install the insert 107, the frame 110 and folded retention flanges 112, 114 are inserted into the access opening 130 diagonally. The insert 107 is then straightened out. The retention flanges are unfolded and extend outward to be placed underneath the flanges 174 of the console. The support strut 126 is then connected with the feet 118 of the retention flanges.

Figure 12:
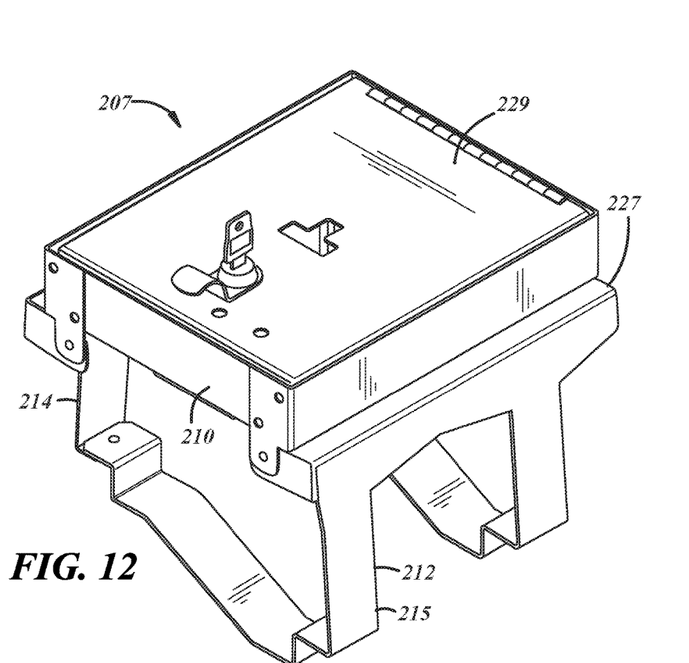
FIG. 12 is a perspective view of an alternate preferred embodiment insert according to the present invention.
Figure 13:
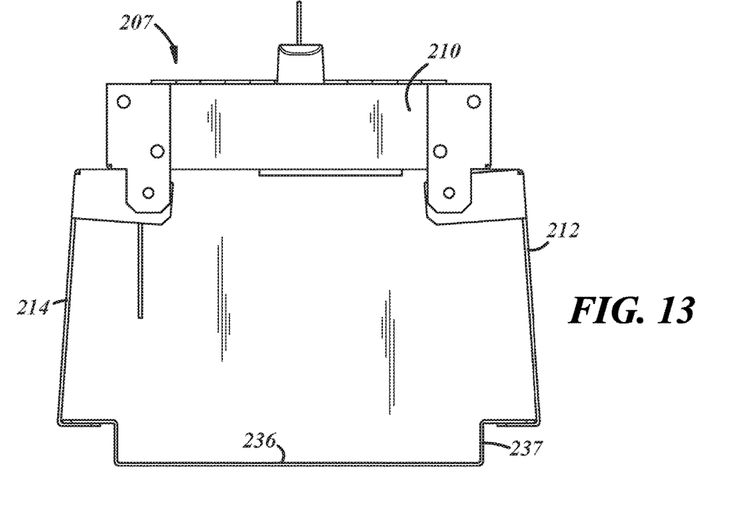
FIG. 13 is a side view of the insert shown in FIG. 12.
Figure 14:
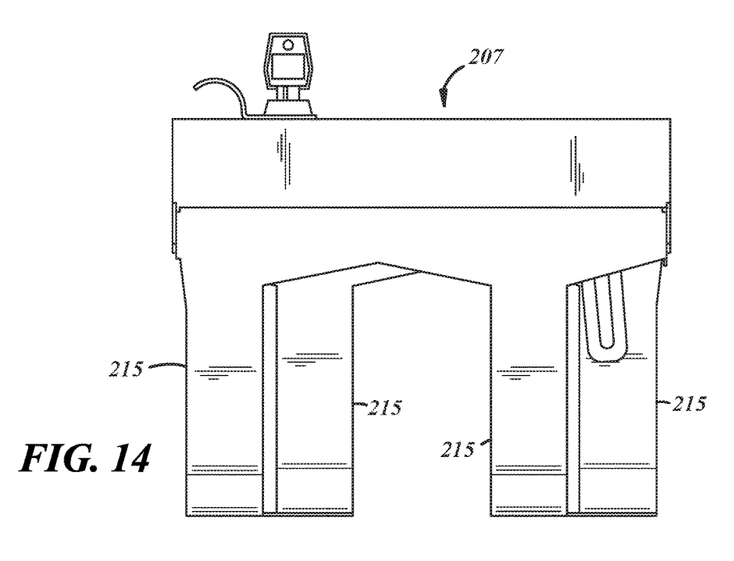
FIG. 14 is a front view of the insert shown in FIG. 12.

Referring to FIGS. 12-14, an alternate preferred embodiment insert 207 is provided. Insert 207 has retention flanges that are identical to each other. However, when the retention flanges 212 and 214 are connected to the frame 210, their respective legs 215 are non-transversely aligned. The non-transversal alignment makes the legs to be non-conflicting when folded for installation into the access hole of the console. The retention flanges 212, 214 when extended have a top surface lower than that of the lid 229 or frame 210. Retention flanges 212, 214 extend along an axis that extends in a fore and aft direction of the vehicle (or parallel to the vehicle longitudinal axis). Retention flanges 212, 214 are slightly inclined from vertical when extended and the support strut 236 has an L-shaped flange 237 to match the contour of the console floor that the insert 207 is installed in.

Figure 15:
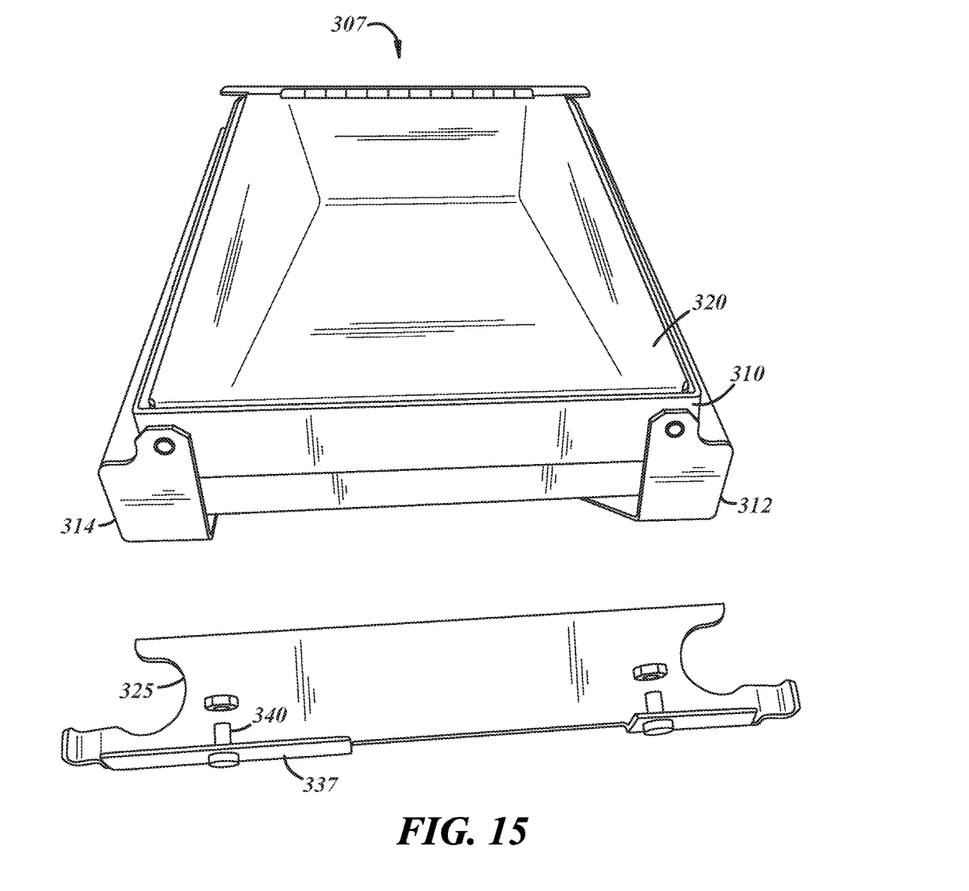
FIG. 15 is a perspective view of yet another preferred embodiment of the present invention.
Figure 16:
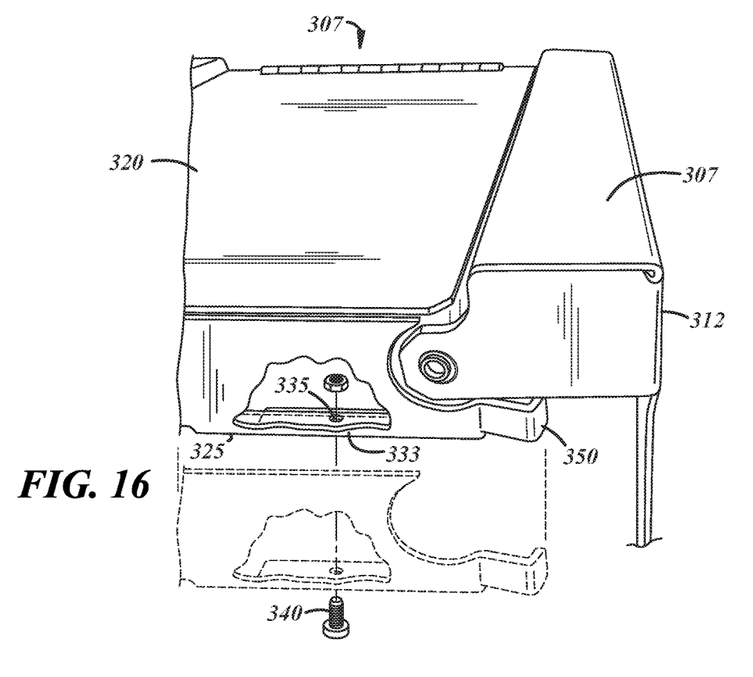
FIG. 16 is an enlarged perspective view of the insert shown in FIG. 15

Referring to FIGS. 15 and 16, an insert 307 is provided. Insert 307 has fore and aft extending retention flanges 312, 314 that when extended have a top surface 317 that is above the lid 320 or frame 310 of the insert when the retention flanges 312, 314 are extended outward. After the retention flanges are extended outward a bracket 325 or security plate is connected to the front of the frame 310. Frame 310 has an inward bent lower flange or rim 333 with holes 335. Bracket 325 has an inward bent flange 337 that is mated underneath flange 333. Screws 340 are extended through holes in the flange 337 into mating holes 335 in the frame inner rim 333 to connect the plate 325 to the frame 310. When connected prongs 350 extend underneath the retention flanges 312, 314 to prevent retention flange rotation after the retention flanges have been extended to an area underneath the console flanges.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An insert for a vehicle console having a lid and a top flange with an access opening below the lid, the vehicle console further having an interior storage area, said insert supporting and retaining a lockable lid that prevents unauthorized access to the interior storage area through the access opening of the vehicle console, said insert comprising:

a frame having first and second sides opposing one another, said frame being adapted for supporting the lockable lid;

a first retention flange, said first retention flange being hingedly supported from said first side of the frame, such that said first retention flange is capable of angularly rotating away from said second side of said frame along a pivotal axis generally parallel to at least one of said first and second sides of said frame, said first retention flange being able to pivotally extend beyond the access opening of the vehicle;

a second retention flange, said second retention flange being hingedly supported from said second side of said frame, such that said second retention flange is capable of angularly rotating away from said first side of said frame along a pivotal axis generally parallel to at least one of said first and second sides of said frame, said second retention frame being able to pivotally extend beyond the access opening of the vehicle console;

a support strut for restraining said first and second retention flanges from pivoting away from a position extending beyond the access opening of said vehicle console.

2. An insert as described in claim 1 wherein at least one of said retention flanges is hingedly supported along two eyelets with said frame.

3. An insert as described in claim 1 wherein at least one of said retention flanges has a top surface that is above said frame when said retention flange is rotated outward.

4. An insert as described in claim 1 wherein at least one of said retention flanges top surface is below said frame when said retention flange is pivotally extended beyond the access opening of the vehicle console.

5. An insert as described in claim 1 wherein said support strut is a bracket connected on said frame preventing pivotal movement of at least one of said retention flanges after being rotated outward.

6. An insert as described in claim 1 wherein said support strut is a bracket connecting ends of said first and second retention flanges.

7. An insert as described in claim 1 wherein said retention flanges extend along a fore and aft direction of said vehicle.

8. An insert as described in claim 1 wherein said retention flanges extend along a transverse direction of said vehicle.

9. An insert as described in claim 1 wherein said retention flanges have a plurality of legs and said legs are non-conflicting when folded for installation.

10. An insert as described in claim 1 wherein said support strut is attached to said retention flanges by a fastener.

11. An insert as described in claim 10 wherein said retention flanges have a pressed in nut to receive a threaded fastener passing through said bracket.

12. An insert as described in claim 10 wherein said fastener is connected with a body portion of said vehicle.

13. An insert as described in claim 8 wherein there is a rear plate between said frame and an aft surface of said console flange, and wherein said retention flange is adjacent an aft end of said frame and has a slot allowing for passage of said rear plate.

14. An insert as described in claim 8 wherein there is a front plate between said frame and a forward surface of said console flange and wherein said retention flange adjacent a forward end of said frame has a slot allowing for passage of said forward plate.

15. An insert as described in claim 1 wherein a pivotal damper is provided between said lockable lid and said frame, said damper including a slotted link pivotally connected with said lid;

a pin captured by said slot in said slotted link, said pin being received in an aperture in said frame;

a lock nut connected with said pin wherein said pin can be torqued within said washer to set a dampening of said lid with said frame.

16. An insert as described in claim 1 wherein a top surface of at least one of said retention flanges has an adhesive material to promote contact with said console.

17. An insert as described in claim 1 wherein a bottom surface of one of said retention flanges has an anti-rattle material connected thereto.

18. A method of installing an insert for a vehicle console as described in claim 1 including the steps of:

placing the insert through the access opening of the vehicle console;

rotating outward the first and second retention flanges so that the retention flanges extend beyond the access opening;

installing a support strut to restrain said retention flanges from pivoting away from a position extending beyond the access opening of said console.

19. An insert for a vehicle console having a lid and a top flange with an access opening below the lid, the vehicle console further having an interior storage area, the insert supporting and retaining a lockable lid that prevents unauthorized access to the interior storage area through the access opening of the vehicle console, said insert comprising:

a frame having first and second sides opposing one another, said frame being adapted for supporting the lockable lid;

a first retention flange extending along a fore and aft direction of said vehicle, said first retention flange being hingedly supported from said first side of said frame, such that first retention flange is capable of angularly rotating away from said second side of said frame along a pivotal axis generally parallel to at least one of said first and second sides of said frame, said first retention flange being able to pivotally extend beyond the access opening of the vehicle console;

a second retention flange extending along a fore and aft direction of said vehicle, said second retention flange being hingedly supported from said second side of said frame along a pivotal axis generally parallel to at least one of said first and second sides of said frame, said second retention flange is capable of rotating angularly away from said first side of said frame, so that the second retention flange can extend beyond the access opening of the vehicle console;

a support strut for restraining said first and second retention flanges from pivoting away from a position extending beyond the access opening of said vehicle console; and wherein said retention flanges when extended have a top surface above said lid and frame, and wherein there is a security plate attached to a forward surface of said frame and said security plate has prongs to prevent pivotal movement of said retention flanges after extension to an area underneath said console flange.

20. An automotive vehicle having first and second seats transversely spaced away from one another with a console between said seats, said console having a lid and a top flange with an access opening below the lid, the vehicle console further having an interior storage area, said insert supporting and retaining a lockable lid that prevents unauthorized access to the interior storage area through of the access opening of said vehicle console, said insert including:

a frame having first and second sides opposing one another, said frame being adapted for supporting the lockable lid;
a first retention flange, said first retention flange being hingedly supported from said first side of said frame, such that said first retention flange is capable of angularly rotating away from said second side of said frame along a pivotal axis generally parallel to at least one of said first and second sides of the frame, said first retention flange being able to pivotally extend beyond the access opening of the vehicle;
a second retention flange, said second retention flange being hingedly supported from said second side of said frame, such that said second retention flange is capable of angularly rotating away from the opposing sides of said frame flanges and extending away from said opposite retention flange, while remaining generally parallel to one of the opposing sides of said frame, so that said retention flanges extend beyond the access opening of the vehicle console;
a support strut for restraining said first and second retention flanges from pivoting away from a position extending beyond the access opening of said vehicle console.

\* \* \* \* \*